United States Patent

Gerke et al.

[15] 3,655,922

[45] Apr. 11, 1972

[54] SWITCHING ARRANGEMENT FOR TELEPHONE EXCHANGE-INSTALLATION

[72] Inventors: Peter Gerke, Grafelfing; Karl Rutkowski, Pullach; Helmuth Joachim Bock, Munich, all of Germany

[73] Assignee: Siemens Aktiengesellschaft, Berlin and Munich, Germany

[22] Filed: Oct. 18, 1968

[21] Appl. No.: 768,751

[30] Foreign Application Priority Data

Oct. 19, 1967 Germany ............................S 112478

[52] U.S. Cl. ........................................179/18 E, 179/16 EC

[51] Int. Cl. ........................................................H04q 3/42

[58] Field of Search .............179/16 EC, 18 E, 18 EB, 18 ET, 179/18 ES

[56] References Cited

UNITED STATES PATENTS 3,484,559 12/1969 Rigby ..................................179/18 E 3,409,742 11/1968 Winter..............................179/18 EB 3,536,846 10/1970 Reines et al.......................179/18 ET

*Primary Examiner*—William C. Cooper

*Attorney*—Irons, Birch, Swindler and McKie

[57] ABSTRACT

A telephone exchange installation wherein information is transmitted between a central control mechanism and individual apparatus over a two-stage transmission network including buffer storage means interposed between the two stages. Information is transmitted in parallel code between the buffer storage means and the individual apparatus which utilizes relatively inexpensive and relatively slow-working switching elements. Information is transmitted in series code between the buffer storage means and the central control mechanism which utilizes electronic, relatively fast-working switching elements. Optimum utilization of the telephone exchange equipment is thereby achieved by adjusting for the differing speed of operation of the switching elements in the central control and the individual apparatus and the resulting variance in the speed of information transmission.

8 Claims, 3 Drawing Figures

Fig. IB
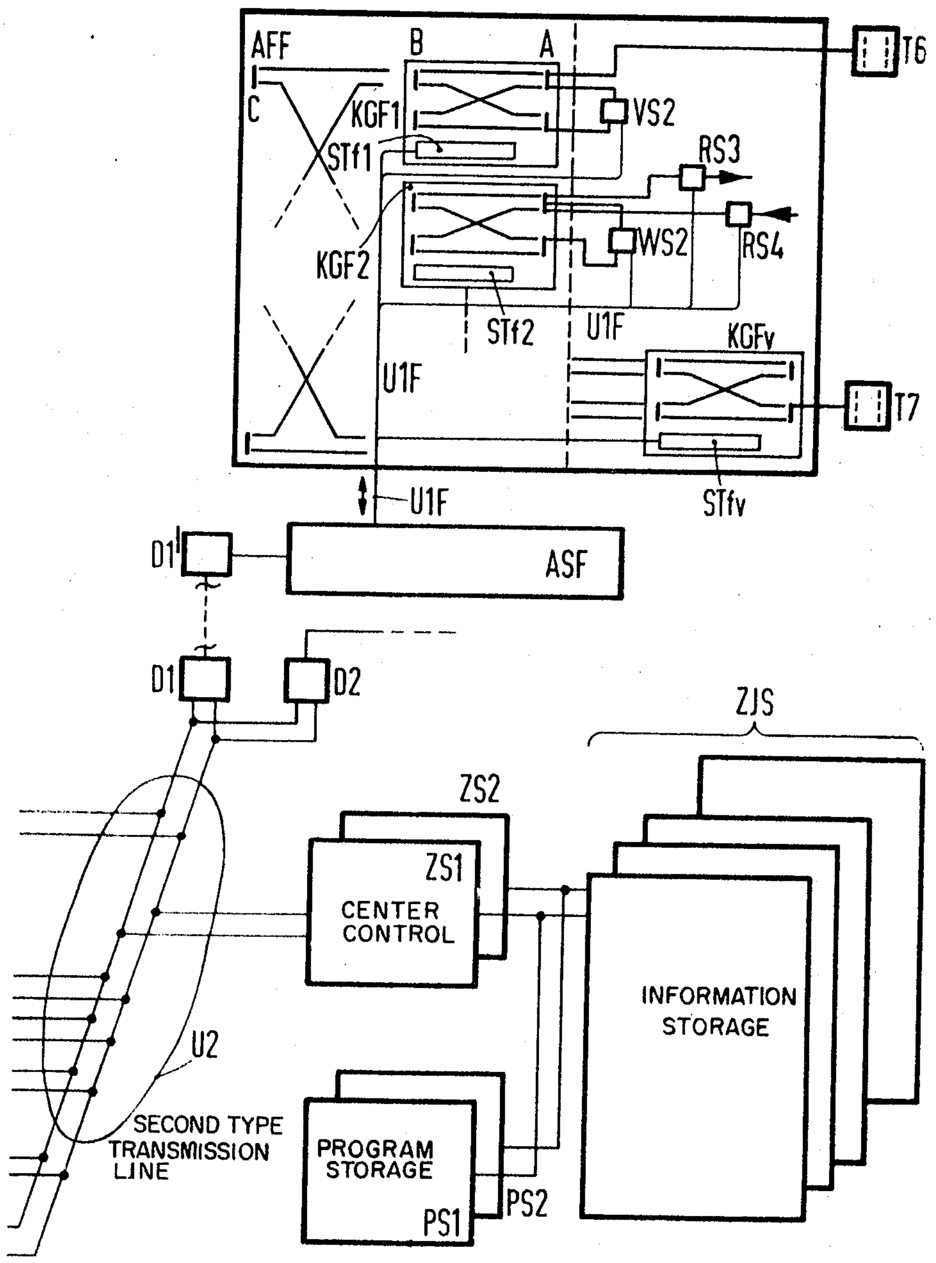

SWITCHING ARRANGEMENT FOR TELEPHONE EXCHANGE-INSTALLATION

BACKGROUND OF THE INVENTION

1. Field of the Invention

The invention relates to a switching arrangement wherein information is transmitted in different coded forms over first and second types of transmission lines. It has particular utility in the telephone communication art for transmission of information between central and individual apparatus.

SUMMARY OF THE INVENTION

The invention concerns a switching arrangement for telephone communication installations having central apparatus. The latter comprises central control means and individual apparatus, in particular, exchange-technical switching systems: for example, switching matrixes with path finding and setting systems, subscriber connection circuits, identification means, external and internal connection sets, dial receivers, registers, and the like. As used herein, "exchange-technical switching systems" refers to switching systems particularly adapted to the technology of telephone exchanges.

The central apparatus also includes buffer storage and/or recoding systems that are connectable to the individual apparatus over first transmission lines and to the central apparatus over second transmission lines. The buffer storage and/or recoding systems are equipped for adaptation of the time conditions of both kinds of apparatus (individual and central) during transmission of information therebetween; on one hand, the same as the individual apparatus having relatively slow-operating electromagnetically operative transmission and receiving switching means associated with the first transmission lines, and on the other hand, the same as the central apparatus having relatively fast-working electronically operative transmission and receiving switching means associated with the second transmission line. As used herein, "adaptation of the time conditions" refers to the adaptation of the speed of information transfer to the operating speed of the receiving apparatus.

Such distribution of transmission lines between individual and central apparatus is already known, Therein converters are provided as central apparatus and pulse generators and selectors of different dial stages as individual apparatus. Storage means for dial reception and setting means assigned to the dial stages serve as buffer storage and recoding systems. These different individual members are combined into groups wherein meter pulse generators form one group, and further groups are formed by the selectors of the different dial stages. The mentioned buffer storage and recoding systems (storage means for dial reception and setting means of selectors) are fixedly assigned to the groups.

The sub-division of transmission lines between individual and central apparatus when using transmission lines of a first and second type with interconnection of the buffer storage and recoding systems is mainly of importance for the adaptation of the operating speeds of apparatus of both types (individual and central). During information exchange, the individual apparatuses operate slowly since, for economical reasons, they are equipped with correspondingly inexpensive switching devices, for example relays. In contrast, the central apparatus must operate relatively fast at information exchange (information reception and transmission) in addition to information processing, in order to be able to take care of the volume of work accumulating for it from the individual apparatus. For this purpose the buffer storage and recoding systems are equipped, on one hand, as the individual apparatus with relatively slow-working electromagnetic transmission and receiving switching means (for example relays) at the transmission lines of the first type, and on the other hand, as the central apparatus with relatively fast working electronic transmission and receiving switching devices, (for example transistors) at the transmission lines of the second type.

Moreover, due to the sub-division of the transmission lines into first and second types, the network of transmission lines is advantageously developed; that is, the transmission lines of all individual apparatus do not have to be guided to the central apparatus, but may be functionally (not directly) combined in transmission lines of the second type. This arrangement is assisted by the fact that the individual apparatuses are combined into groups in the above described manner, and that buffer storage and recoding systems are individually assigned to these groups. Therefore, through appropriate constructive combination (for example, in a framework), the line lengths of the transmission lines of the first type can be kept much shorter than the line lengths of transmission lines of the second type. This is very advantageous, especially due to the fact that transmission lines of the first type are provided in a much larger number than those of the second type.

A comparison of the switching devices for information exchange, on one hand, on transmission lines of the first type, and, on the other hand, on transmission lines of the second type may be related to the components presently used in the art: relatively slow-working switching devices (relays) as compared to relatively fast-working switching devices (transistors), both being suitable as information transmission and receiving switching devices. The comparable switching times differ by approximately 4 to 5 tenth powers. It can be found that this ratio is considerably higher than the required ratio of the operating speeds on the two types of transmission lines.

It is therefore the task of the invention to provide, utilizing the switching time possibilities available through customary switching devices, optimally suitable information transmission for the purpose of the best possible economic development of the network of transmission lines of both types. This task is solved through the fact that information is transmitted over multi-conductor transmission lines of the first type in a parallel code and over transmission lines of the second type in a series code.

According to the invention, the requirement for multi-conductor transmission lines is limited to those of the first type which are connected only between individual apparatus and at least one buffer storage and recoding system. The use of multi-conductor lines for transmission lines of the first type makes possible the insertion in large number of relatively inexpensive and strong components into the individual apparatus available. The transmission lines of the second type, however, can be developed as two-wire lines or four-wire lines in a transmission-technical sense, as the corresponding transmission and receiving switching devices in the buffer storage and recoding systems and central members by far operate fast enough to also guarantee the transmission of all information in series code. This makes it possible to form groups of individual apparatus with individual buffer storage and recoding systems, and to operate these economically both centrally and remotely-controlled, because the transmission lines of the second type have only small requirements as compared to multi-conductor lines.

For the sake of completeness it is pointed out that a multi-frequency code transmission line corresponds to a multi-conductor line for the transmission of a parallel code. Thus due to the invention the further advantage is provided that on transmission lines of the second type, a single signal frequency is sufficient for signal transmission, instead of a costly multi-frequency code transmission process.

DETAILED DESCRIPTION OF THE INVENTION

Figure 1:
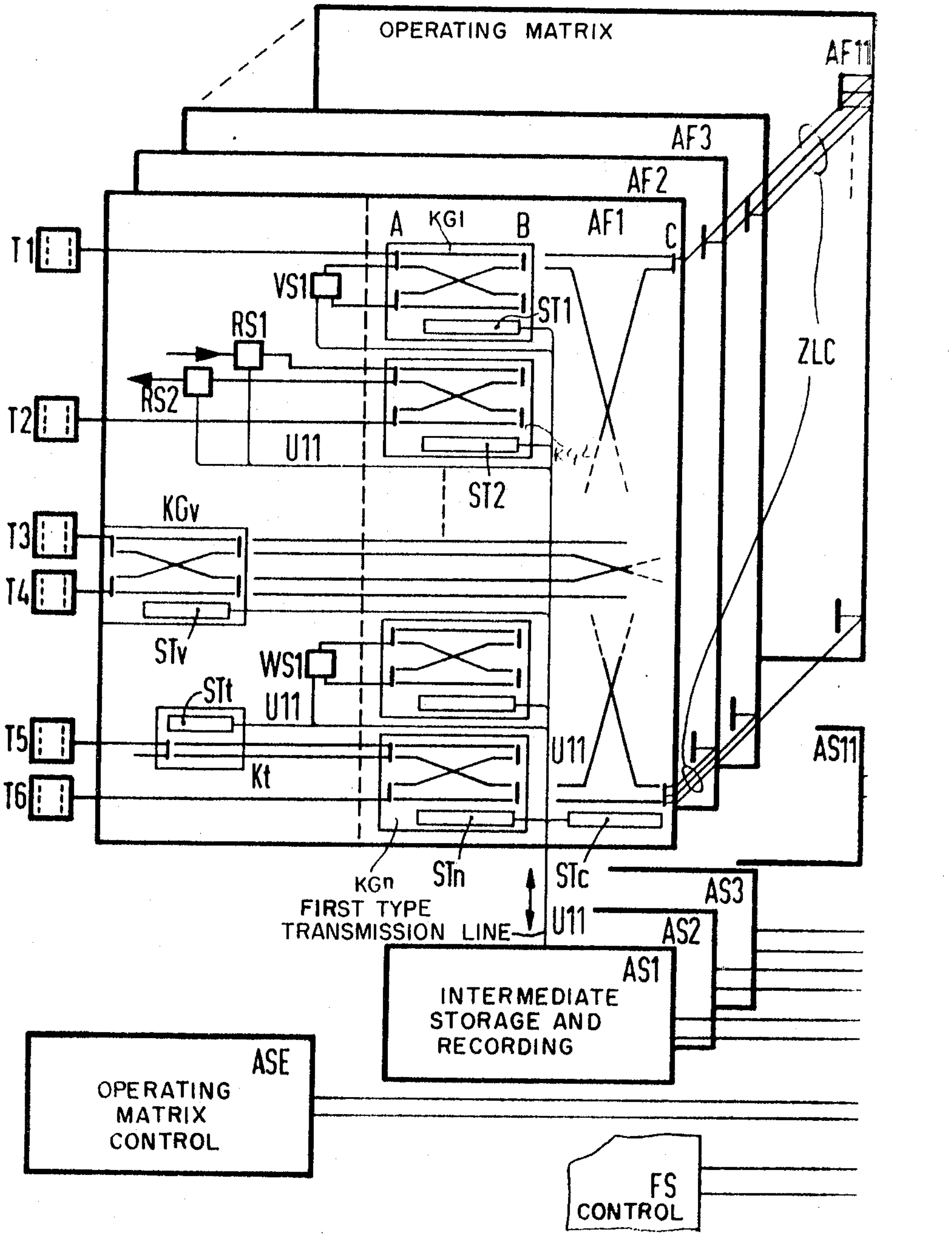
FIG. 1 is a block diagram of a telephone exchange according to the invention.

FIG. 1 shows a telephone exchange installation according to the invention having a plurality of groups of operating matrixes AF1 . . . AF11, and AFF. Intermediate storage and recording systems AS1 . . . AS11 comprise operating matrix control means for operating matrixes AF1 . . . AF11, respectively. The operating matrix control means AS1 . . . AS11 of the exchange installation are connected by transmission lines U2 of the second type with first and second central control means ZS1 and ZS2, respectively. The arrangement of the two central control means serves, in known manner, to increase the operational reliability of the entire exchange installation with regard to the possibility of a misfunction or an interruption of the operation of a central control means. It also functions to supervise errors by comparing two informations supplied independently of one another by the two different central control means. As this is not essential for understanding the invention, a single central control means is usually discussed hereafter.

First data transmission apparatuses D1, D2, . . . , are also connected to transmission lines U2. In each case these form with second individually assigned data apparatuses D1′, D2′, . . . , respectively and a corresponding connection line, data transmission paths which individually make it possible for distant operating matrixes, for example AFF, to exchange information with central control means ZS1 and ZS2. Data apparatus D2 thus pertains to a second data transmission path and a further (not shown) distant operating matrix. Moreover, it is also possible to provide a common data path for several operating matrixes located at the same distant location.

The operating matrixes each comprise, inter alia, coupling stages A and B of the three-stage switching matrix having coupling groups consisting of individual coordinate couplers, for example KG1 to KG*n* in the instance of operating matrix AF1 and KGF1, KGF2 . . . , in the instance of distant operating matrix AFF. To each coupling group an individual control means, for example ST1 in the instance of coupling group KG1, is assigned, which carries out the setting orders received from the operating matrix control means. In each case one coupling group and its assigned individual control means constitutes an individual apparatus. Further, the entirety of the couplers of coupling stage C with its control means ST*c* are individual apparatus.

It is also possible to combine these couplers in an operating matrix in several individual apparatus having individual control means. Further, connection sets, for example VS1 for connections to be switched-through within the exchange installation consisting of operating matrixes AF1 to AF11, are individual apparatus. Relay sets, for example RS1 and RS2, are individually assigned by connection lines (local and long distance lines) to exchange installations at other locations for arriving and/or departing connections. The individual apparatus also includes dial receivers, for example WS1, which serve subscribers for reception of dial information signals; preferred coupling groups, for example KG*v* having individual control means ST*v*; and preferred one-stage couplers, for example K*t*, having individual control means ST*t*. These preferred coupling groups and one-stage couplers are of an importance which corresponds to the larger and smaller dial star switches known in customary exchange installations. Moreover, not shown subscriber—individual subscriber connection circuits can be arranged as individual apparatus or in groups.

All of these individual apparatuses of an operating matrix for example AF1 are connected, over a network of transmission lines of the first type, for example U11, with the operating matrix control means in question, for example AS1. Each individual apparatus contains connection devices which are controllable by the operating matrix control means. For this, if the requirement for a connection exists in the individual apparatus, a connection impulse is given therefrom to the identified operating matrix control means which leads to the transmission of an order to effect connection to the individual apparatus in question.

The coupling switching devices of several operating matrixes in one location form a single common switching matrix, which is divided, only for reasons which have no causal connection with the grouping of the switching matrix (for example reliability, expansion possibilities, and questions of traffic load) into several applicability areas having several operating matrix control means.

The switching matrix formed from the coupling switching devices in coupling stages A, B and C of operating matrixes AF1 to AF11 corresponds in its development to that which is the principal object of German Pat. application No. S 110291 VIII*a*/213, and that shown in British Pat. No. 1,058,895. This switching matrix as shown therein is developed of couplers in several (preferably three) coupling stages, connected over intermediate lines to the inputs of the first coupling stage. Subscriber lines, connection lines and all inputs and outputs of switching devices necessary for connection establishment and connection supervision for each connection, are similarly connected. Outputs of the couplers of the first until the next to the last coupling stage which are connected individually to the inputs of the couplers of the coupling stage switched subsequently in each case, are connectible in each case in pairs in this subsequent coupling stage. Such a switching matrix is shown and described in British Pat. No. 1,058,893.

The special characteristic of the development of such a known switching matrix resides, according to the above identified stated published application, in the fact that from one switching matrix input the outputs of each of the couplers can be reached over one single connection path at the most. Thereby during pathfinding from the direction of a switching matrix input, through selection of one of these outputs, the path to be switched through over the switching matrix for the desired connection is already clearly fixed. The switching matrix, viewed from its inputs to the outputs of its couplers, is developed in purely fan-shaped fashion. Nevertheless, two switching matrix inputs can alternatively be connected over different paths because there are always accessible, from the direction of the two switching matrix inputs, several common coupler outputs, or several times two coupler outputs each, pertaining to the last coupling stage in different operating matrixes and connected over one intermediate line each.

The operating matrixes, for example AF1, thus possess three coupling stages each, the couplers whereof are connected over intermediate lines in such a way that to one coupler output each in the first to the next to the last coupling stage A and B, one coupler input each in the second to the last coupling stage B and C is individually fixedly assigned. The outputs of the couplers of coupling stage C in all operating matrixes AF1 to AF11 and AFF are at least partially disconnected. In operating matrixes AF1 to AF11 a part of these outputs is individually connected in pairs over intermediate lines ZLC leading from one operating matrix to another.

To the two central control means ZS1 and ZS2 arranged next to each other there are respectively assigned program storage means PS1 and PS2. The central control means read from the program storage means according to which program comprising information transmitted by an operating matrix control means to be processed is received in the central control means. In addition, a common multi-part information storage means ZJS is assigned to the two central control means, the entire storage capacity whereof is available to the two central control means according to the needs in each case.

To the network of transmission lines U2 there is assigned control apparatus FS for the input and output of information by which central control means ZS1 and ZS2 can be reached directly. It is possible through control apparatus FS to check the mode of functioning of the central control means and change the storage contents of program storage means PS1 and PS2 (take out of storage and/or store).

There is further assigned to the network of transmission lines U2 an operating matrix control mechanism ASE, which, in case of a disturbance in one of the operating matrix control means AF1 to AF2, can be connected temporarily thereto as a substitute for it. Thus the operating matrix control means are uniform among one another and can be exchanged for one another.

Figure 2:
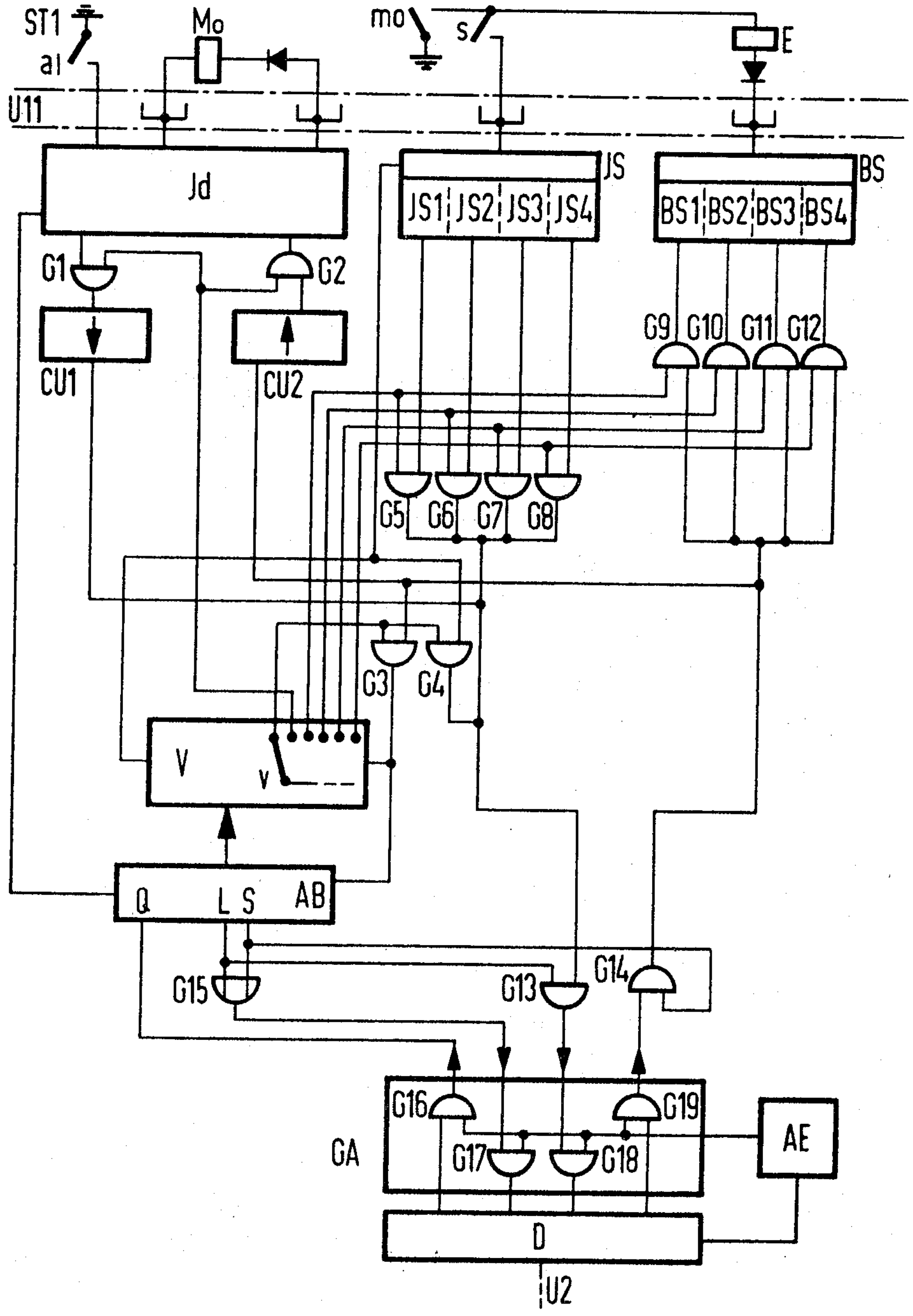
FIG. 2 is a circuit diagram in which the control means of FIG. 1 is shown in greater detail.

FIG. 2 gives further details of an operating matrix control means (AS1) shown in FIG. 1. The operating matrix control means is in connection, over transmission lines of the first type, for example U11, with individual apparatus, for example control system ST1 of coupling group KG1, and over transmission lines of the second type (U2) with the central control means shown in FIG. 1. The operating matrix control means can be requested by individual members, for example coupling group control ST1. With the aid of identification device *Jd*, the operating matrix control means is in a position to select one from several simultaneously present connection impulses, which are actuated over request contacts such as *al*, and transmit a corresponding order to connect to the connection relay M*o* which corresponds to the connection impulse in question.

The request circuits are connected individually to the operating matrix control means from each individual apparatus. However, it is also possible to provide request contacts such as *al* of the individual apparatus ST1 in a coordinate matrix. Thereby the number of request circuits can be reduced substantially and, in the most favorable instance, to twice the square root of the number of individual apparatus served by an operating matrix control means. The connection relays such as M*o* of the individual apparatus are located in a control matrix extending over all individual apparatus.

With the aid of contact mo of connection relay M*o*, transmission switching device *s* and receiving switching device E of switching matrix control means ST1 are switched effective. It is pointed out that there are a plurality of transmission switching device *s* and receiving switching device E of coupling group control means ST1, and that information applied to and from the latter is transmitted over transmission line U11 under a parallel code. This means that the transmission lines connected to transmission switching device *s* and receiving switching device E are of a multi-conductor type. The entire information to be transmitted in each case simultaneously lies at the conductors of multi-conductor transmission line U11.

The transmission lines of the first type, for example U11, do not extend over long distances. Further, relatively inexpensive transmission and receiving switching devices can be inserted because these, utilizing the parallel code transmission method, fully satisfy the speed requirements for the information transmission. Therefore the relatively large number of circuits of the transmission lines of the first type, as well as the transmission and receiving switching devices for connection and transmission, does not present unfavorably high switching and other technical expenses. In the present case the receiving and transmitting switching devices comprise electromagnetic relays, or contacts thereof. However, it is also possible to substitute other equivalent switching devices therefor.

Preparatory to the description of the mode of operation of the operating matrix control means some definitions of terms will be given. As already evident from the above explanation, information is transmitted from the individual apparatus to the central control means, as well as from the central control means to the individual apparatus. In any case, the operating matrix control means serves as an intermediate member. Information transmission from one individual member to the central control means is subsequently always designed as "reading." The reverse information transmission from the central control means to an individual apparatus is always designated as "writing." Accordingly, the criteria "reading" and "writing" are formed in the operating matrix control means.

The criterion "reading" is always formed in the operating matrix control means if a request by an individual member, for example, coupling group control means ST1, is present over request contact *al* and if all switching processes of preceding functional programs are terminated. However, if no such request by an individual member is present, the criterion "-writing" is formed in the operating matrix control means which expresses the readiness of the operating matrix control means to receive information which may be present in the central control means and is to be transmitted to the said operating matrix control means.

Moreover, it can also be the case that neither a request by an individual member is present that the operating matrix control means is ready to receive information. This operational state exists in the case when an operating matrix control means has not yet completed processing certain information. The operating matrix control means is thus not ready for any kind of information exchange with the central control means. The criterion "block" is then formed in the operating matrix control means.

As is evident from FIG. 1, and as has already been described, two central control means are provided. Accordingly transmission lines of the second type such as U2 are also provided in duplicate. Further, systems and circuits which serve to transmit information are also in part provided twofold in the operating matrix control means. For reasons of simplicity this is not shown in FIG. 2. Further, at different locations comparison arrangements (not shown) are provided. It is thereby possible to supervise the accuracy of information transmission and processing. Furthermore it can be assured, in simple manner, that upon the occurrence of a disturbance at any point of the central information transmission paths, operation of the exchange installation can still be continued. As these advantages of duplicating central parts are known per se, this duplication is shown in the working example only at some points.

A common transmission line U2 is connected from central control means ZS1 to all operating matrix control means. It scans cyclicly and in succession, all operating matrix control means to determine in each case whether the criterion "reading," "writing" or "block" is present. For this purpose each operating matrix control means has a connection system GA. An address receiver AE is assigned to this connection system GA. In order that, during scanning of the operating matrix control means by the central control means, always only one single operating matrix control means is connected, each connection is caused through the transmission of the address corresponding to the operating matrix control means in question from the central control means. (Under no circumstances should this address be confused with the addresses of the individual apparatus described in detail later.)

This address transmission from the central control means to an operating matrix control means for temporary connection of the latter to transmission line U2 can be carried out in different ways. It is possible to assign a separate address line to transmission line U2. The central control means transmits, for the duration required for connection, the address of the operating matrix control means in question. The beginning and end of the connection is determined in simple manner through the beginning and end of the address transmission over the address line.

It is also possible to transmit the address of the operating matrix control means in question which is to be connected to or disconnected from transmission line U2 over the latter. The address receiver of each operating matrix control means must thereby be permanently connected to transmission line U2. The connection and disconnection of the operating matrix control means through its connection system GA in this case is always caused, from the direction of the central control means, through the fact that the address of the operating matrix control means in question is transmitted with an additional criterion "connect" or "disconnect" unto the transmission line U2 from the direction of the central control means to all operating matrix control mechanisms. This connection guarantees that the addresses with the additional criterion in each case will not be confused with the remaining information to be transmitted over the transmission line U2 because only the connection system of the operating matrix control means in question reacts thereto in the desired manner.

If the connection or disconnection of an operating matrix control means to or from transmission line U2 is caused by the central control means, only the address receiver of the operating matrix control means in question reacts and opens or closes the coincidence gates, G16, G17, G18 and G19, of connection system GA.

The criteria "reading," "writing" and "block" are formed in program control AB of the operating matrix control means. The criterion "reading3[ is transmitted over output L of program control AB, and the criterion "writing" over output S of the program control. The criterion "block" resides in the fact that the criteria "reading" and "writing" are transmitted at the same time. It is, however, also possible to identify the criterion block by the absence of criteria "reading" and "writing," or to provide a third signal circuit therefor.

The criteria "reading," "writing" and "block" are offered to the central control means. When the central control means causes over connection system GA the connection of an operating matrix control means to transmission line U2, it always receives one of these three criteria. For the transmission of these criteria, special criteria lines can be assigned to transmission line U2. However it is also possible to offer these criteria to the central control means over transmission line U2.

There is also shown in FIG. 2 one of the two end apparatuses D of a data transmission path. As is evident from FIG. 1, it is possible to remotely control operating matrix control means such as AFF from the direction of the central control means. In this case it is suitable to include into the branch of transmission line U2 leading to a remotely controlled operating matrix control means a data transmission path, the end apparatuses whereof are D1 and D1' in FIG. 1. The mode of operation of data transmission lines in itself is not the object of the invention and for this reason is not described in any further detail.

If in an operating matrix control means the criterion "-writing" is present, there is thus transmitted a corresponding criterion to the central control means as soon as the latter causes in already described manner the connection of the operating matrix control means over the connection system GA thereof. If the central control means has stored in its information storage means information to be transmitted to the operating matrix control means in question, it then carries out the transmission of such information to the said operating matrix control means in a manner described in more detail hereafter. However if no such information is present, the central control means causes again in the manner described disconnection of the operating matrix control means from transmission line U2 by its connection system GA.

However if in an operating matrix control means the criterion "block" is present when the central control means causes the connection of this operating matrix control means, the central control means causes in the manner described the disconnection of the operating matrix control means in question, independently from the fact as to whether or not information to be transmitted from the central control means to the operating matrix control means is present.

However, if the criterion "reading" is present in an operating matrix control means, it is also transmitted over gates G15 and G17 upon connection of the operating matrix control means to the central control means. Thereupon the central control means returns a criterion to the operating matrix control means which initiates transmission of the information in question from the operating matrix control means over transmission line U2 to the central control means. The information is transmitted in several segments. Each information segment is separately initiated and acknowledged by special criteria. This and the transmission of information in segments will be explained hereafter in more detail.

Each information is subdivided into several information segments. All information is preferably coded in binary code, i.e., the information transmitted over transmission lines U11 and U2 as well as the information temporarily stored in the operating matrix control means and recoded. Recoding in the operating matrix control means is for adapting information transmission on transmission lines of the first type, for example U11 in parallel code, to information transmission on the transmission line of the second type, U2, in series code. The information is transmitted on transmission lines of the first type with the aid of electromagnetic relays and on the transmission line of the second type with the aid of electronic switching devices, for example transistors. The high operating speed of the latter not only serves to decrease the transmission time on central transmission line U2 of the second type, but also makes possible information transmission in the mentioned series code, by reason of which only a few transmission channels are required. In contrast, over transmission lines of the first type, information is transmitted over multi-conductor lines. As these extend only over relatively short distances, and pose no high costs in their multiconductor construction due to information transmission by means of parallel code, suitable transmission times can also be achieved with electromagnetic relays, or equivalent switching devices that are favorably inexpensive.

Further, as transmission lines of the second type extend over relatively long distances, with the aid of a data transmission path, for example one encompassing the radius of a large city or of a junction exchange office area, series code transmission operating slower compared to parallel code transmission can be employed for information transmission due to the use of electronic transmission and receiving switching devices because the switching time of the latter is smaller by a factor of from four to five tenth powers than that of electromechanical relays. This permits limiting the cost of transmission lines U2 of the second type.

It has already been explained that the information is subdivided into several information segments, the transmission whereof is carried out in segments over the transmission line U2 of the second type with the aid of controlling criteria.

All subscriber information is transmitted simultaneously over the multi-conductor transmission line U11 to the operating matrix control means. Information storage means JS comprises a separate part for each of four information segments: JS1, JS2, JS3 and JS4. Further, command storage means BS provides a separate part for each of the four information segments: BS1, BS2, BS3 and BS4. The different designation of information storage means JS and command storage means BS also indicates that in one case the central control means has "readable" information, and in the other case "writable" commands. These definitions are retained in subsequent portions of the specification.

For transmission on transmission line U2, each information transmission consisting of several information segments, and each command consisting of several command segments is supplemented by a length specification and an address. (These are the addresses of individual apparatus; they should not be confused with the addresses of the operating matrix control means.)

Prior to an information or command transmission, the length data are first transmitted. It indicates the quantitative extent of the subsequently transmitted information or of the command. If the total contents thereof can be expressed by less than four information or command segments, the information or command transmission is limited to fewer information or command segments. Due to prior receipt of prior length data, the receiver in each case, i.e., the operating matrix control means or the central control means knows when the information or command transmission will be completed.

Further an address indication precedes each such transmission. Thus it is always specified beforehand from which individual apparatus an information emanates or for which individual apparatus a command is intended.

It has already been explained that information transmitted is divided into several information segments, with the largest number of such segments being limited to four. The address data immediately preceding the information segments on transmission line U2 may additionally comprise segments, the largest number thereof being limited to two. The length data preceding the address data maximally comprises one segment in the present working example.

The length data, the address data and the maximum of four information or command segments are temporarily stored in equally large groups of binary code elements in the operating matrix control means and recoded and transmitted therefrom or thereto; this recoding can be limited to a conversion parallel/series code or vice versa, and can, together with the intermediate storage form a single common process. The mentioned group of binary code elements is designated a byte. A first byte containing the data concerning length, a second and a third byte concerning the address data, and according to the present working example a maximum of four further bytes containing information or commands in each case jointly form a "word." The transmission of a word over transmission line U2 is controlled with the aid of auxiliary criteria. These auxiliary criteria are "reading" (L), "writing" (S), "block" (L+S), as already described, and "acknowledged" (Q).

It has already been indicated in what manner information to be read by the central control means is transmitted from an individual member, for example switching matrix control means ST1 to the operating matrix control means in FIG. 2. A request over request contact an precedes this transmission. Thereupon this request is identified with the aid of identification means *Jd*. The result thereof is the address of the individual apparatus ST1. This address is maintained available by identification means Jd for transmission to code converter CU1. It also excites, over a coordinate control matrix, connection relay M*o* assigned to individual member ST1. With the aid of contact M*o* of the latter, transmission switching device *s*, as well as receiving switching device E of the individual apparatus ST1 are switched effective. Over a plurality of circuits of transmission line U11 the entire information present in the individual apparatus is offered, simultaneously, for example in a parallel code transmission process, to information storage means JS of the operating matrix control means. The information is received in partial storage means JS1 to JS4 of information storage means JS, whereupon the coupling group control means ST1 is again disconnected through release of relay M*o* in question.

The information is divided, corresponding to storing in partial storage means JS1 to JS4 of the information storage means, into several bits. Together with the information there is also present the quantitative extent thereof in information storage means JS. The length data is offered to one of the two inputs of gate G4. The individual bits stored in information storage means JS are offered to one input each of gates G5, G6, G7 and G8. Gates G4 to G8 symbolically express here that the information placed at one of their inputs, mentioned in each case, can only be conveyed on when a corresponding signal is placed, in each case over the other input of the gate, for transmission. This signal is connected by distributor V, with the aid of its switching arm *v*, successively to the different gates G1 to G12, so that successively the individual bits can be transmitted; i.e., first the data as to length, then the address and then the information or the command.

Distributor V is controlled by program control AB. From this program control the criterion "writing" (S) is offered, in rest position, to the central control means over gates G15 and G17. As has already been explained, this means with respect to the central control means that the operating matrix control means is ready to receive a command from the central control means. However, if the operating matrix control means was requested by one of the individual apparatus, then as soon as the length data and the address and information are present, stored and ready to be transmitted in the operating matrix control means, corresponding criteria are transmitted to program control AB which cause it to offer the criterion "reading" over gates G15 and G17 to the central control means. If this causes, in its connection cycle, the connection system GA of the operating matrix control means in question to connect this to transmission line U2, the central control means receives first the criterion "reading" (L) of the individual apparatus in question.

Thus the central control means is to receive information from the just connected operating matrix control means. As soon as the central control means is ready to receive, through connection to a free storage line in the central information storage means ZS, it receives the length data, which is already offered by the operating matrix control means on transmission line U2. It is pointed out here that gate G4 of the operating matrix control means was already enabled or opened for transmission of the length data as soon as the program control AB had ascertained that the length data and the address and information segments were present stored, and ready for transmission in the operating control means. Thus the length data is already present on transmission line U2 when the central control means has caused connection of the operating matrix control means with the aid of connection system GA.

The central control means receives the length data transmitted from the operating matrix control means over transmission line U2. As soon as it has received it, it transmits the criterion "acknowledged" (Q) over transmission line U2 or over a separate criterion line to the operating matrix control means. This criterion arrives in program control AB (Q). Thereupon program control AB transmits, in the already described manner, the criterion "block" to the central control means.

Thereupon the program control AB transmits a switch-forward pulse to distributor V. This switches the distributor switching arm *v* forward by one step. Thereby gate G4 is blocked for transmission of the length data, and gate G1 is enabled or opened for transmission of the address from identification means JD to code converter CU1. As soon as this switching forward is completed, the program control AB disconnects the criterion "block" and connects criterion "reading " This causes the central control means to receive the address data conveyed over gates G1, G13 and G18 unto transmission line U2. As soon as this has taken place, the central control means transmits over the transmission line U2 an acknowledgement through open gate G16 to program control AB. The central control means has received the address. As has already been explained, the address can be transmitted in the form of one or two bytes.

The information segments are transmitted in the same manner after the address, in the form of further bytes from the operating matrix control means towards the central control means. The length data was stored previously in distributor V. Therefore the regular end of information transmission can be determined in the operating matrix control means. As the length data was transmitted to the central control means, the same is also true for the central control means.

After receipt of the last information segment of a word, the central control means information for the last time the criterion "acknowledged" to the program control of the operating matrix control means. As due to the transmission of the length data in the beginning, the quantitative extent of the information to be transmitted was stored in the operating matrix control means as well as in the central control means, it is possible in simple manner to supervise the proper course of information transmission. If after transmission of one of the information segments no acknowledgment signal is transmitted from the central control means to the operating matrix control means, the latter sounds an alarm in a manner not shown after a predetermined time period has elapsed. An alarm is also sounded if the central control means, instead of the expected criterion "reading," receives the criterion "writing" or "-block" without having already received the number of information segments which was indicated by the length data. In one of the two preceding cases the central control means requested not enough information, and in the other case not enough information was offered to the central control means.

Commands are transmitted from the central control means to operating matrix control means in the same manner as information. It has already been outlined that an operating matrix control means which is ready to receive commands keeps available the criterion "writing" at gate G17 over gate G15. As soon as the central control means causes, in the manner already described over connection system GA, the operating matrix control means to connect to transmission line U2, it receives the criterion "writing" (S). It is assumed that it has stored a command destined for the operating matrix control means. The central control means now transmits over gate G16 the acknowledgment signal (Q) to program control AB of the operating matrix control means. The program control AB as a consequence causes in a manner not shown over distributor V gate G3 to be switched open to pass the first bit expected from the central control means over gates G19 and G14. This first bit again contains the length data which is received by distributor V and stored. It thereby knows after how many switchings forward of its switching arm *v* the command transmission is concluded.

As soon as the program control AB has received the criterion "acknowledged," it disconnects the criterion "writing." First the operating matrix control means processes the length data, thereupon it conveys a switchforward pulse to distributor V which as a consequence thereof switches its switching arm v forward by one step. Thereupon the program control AB again connects the criterion "writing." The last mentioned criterion causes the central control means to now transmit the address of that individual apparatus for which the subsequent information is intended, instead of the length data, over the transmission line U2 to the operating matrix control means. In addition, the central control means transmits the criterion "acknowledged" to program control AB of the operating matrix control means whereupon this, in a manner not shown, causes over distributor V gate G2 to be switched open to pass the second byte expected from the central control means over gates G19 and G14. This byte which contains the address of that individual apparatus for which the subsequent information is intended or a portion thereof is received over code converter CU2 and transmitted over gate G2 to identification means *Id*. It is thereby converted by code converter CU2. Identification means *Jd* causes over the coordinate control matrix the connection of the connection relay, for example M*o*, of that individual apparatus (ST1) designated by the address.

There are now successively received in the same manner, with the aid of the criteria "writing" and "acknowledgment" the bytes containing the command to be transmitted. These are passed over gates G9 to G12 and received in partial storage means BS1, BS2, BS3 and BS4 of command storage means BS, and stored therein temporarily. Thereafter the central control means causes in the already described manner the operating matrix control means in question to again be disconnected by connection system GA from transmission line U2.

The command stored in command storage means BS is transmitted over a plurality of circuits of transmission line U11, in a parallel code transmission, to receiving switching devices E of individual apparatus ST1. Relay E represents one of many receiving relays provided.

The code converter CU1 or CU2 for a byte pertaining to information or command, in each case containing the address, comprises in conjunction with identification means *Jd* the storage and code conversion system introductorily mentioned here. With regard to the further bytes of a word which contain the information or the command, information storage means JS or command storage means BS represent this storage and code conversion system. The recoding can be limited to a conversion parallel-series code and vice versa, and can form together with the intermediate storage a single common process. Code converters CU1 and CU2 contain on their sides facing connection system GA, electronic transmission and receiving switching devices. The same is true for information storage means JS and command storage means BS.

Moreover, it is also possible to provide and transmit, in addition to the criteria "reading," "writing" and "acknowledgment," further criteria between the central control means and the operating matrix control means and vice versa, with the aid of which transmission of the bytes may be initiated, controlled and terminated.

It is also pointed out that information transmission from operating matrix control means to operating matrix control means, for example the transmission of dial information, is also carried out with the help of transmission line U2 and the central control means. The information in question is transmitted from the operating matrix control means to the central control means, is temporarily stored therein, and subsequently further transmitted from there as command to the other operating matrix control means.

As has already been mentioned, the central control means processes the information transmitted thereto with the aid of a program storage means. However, these processes are of no special importance for the understanding of the invention and are therefore not explained in any further detail.

A variation of the working example is also pointed out according to which the information transmission on transmission line U2 can be varied,, It was stated that this information transmission is carried out by means of a series code transmission process. Moreover, it was described that the length data, the address and the information or the command are transmitted in groups of binary code elements. These groups were called bytes. One such byte each is provided for the length data and for the address. However, the information, or the command are subdivided into several bytes. Instead of transmitting the binary code elements of a byte successively over the transmission line, it is also possible according to the mentioned variation to do this simultaneously. The transmission of the binary code elements of a byte is thusly then carried out in parallel code. However, the different bytes are transmitted in succession. Despite this variation of information transmission one must still refer to a series code transmission procedure with regard to transmission of the bytes over transmission line U2.

It will be evident that many minor changes may be made in the apparatus described herein, without departure from the scope of the invention. Accordingly, the invention is not to be considered limited by such description, but only by the scope of the appended claims.

We claim:

1. A switching arrangement for telephone exchange installations including central control apparatus constituted by central control means, data storage means and program storage means and individual apparatus consisting of switching systems such as switching matrices having line finding and setting systems, subscriber connection circuits, identification means, external and internal connection sets, dial signal receivers, registers, and the like comprising:

first and second types of transmission lines, said first type being multiconductor lines arranged for parallel data transmission, said second type being constructed to accommodate serial data transmission, intermediate storage means, said first type of transmission lines connecting said individual apparatus to said intermediate storage means, said second type of transmission lines connecting said central control apparatus to said intermediate storage means, first type of relatively slowly operating transmission and receiving means connecting said individual apparatus and said intermediate storage means, respectively, to said first type of transmission lines for parallel data transmission and reception therebetween, and second type of relatively faster operating transmission and receiving means connecting said intermediate storage means and said central control apparatus, respectively, to said second type of transmission line for serial data transmission and reception therebetween.

2. The switching arrangement recited in claim 1 wherein individual information transmissions over the second transmission lines are each preceded by length data information indicating the quantitative extent thereof.

3. The switching arrangement recited in claim 1 wherein individual information transmissions comprise a plurality of equal size groups of binary code elements.

4. The switching arrangement recited in claim 2 wherein the length data information comprises an individual group of binary code elements.

5. The switching arrangement recited in claim 3 wherein the length data information comprises an individual group of binary code elements.

6. The switching arrangement recited in claim 5 wherein the number of groups of binary code elements forming individual information transmissions is determined from the length data information.

7. The switching arrangement recited in claim 3 wherein the plurality of groups of binary code elements are transmitted in series coded form.

8. The switching arrangement recited in claim 7 wherein the code elements comprising each group are transmitted simultaneously.

* * * * *